No. 673,016. Patented Apr. 30, 1901.
C. C. COFFINBERRY.
MOWING MACHINE.
(Application filed Sept. 20, 1900.)
(No Model.)
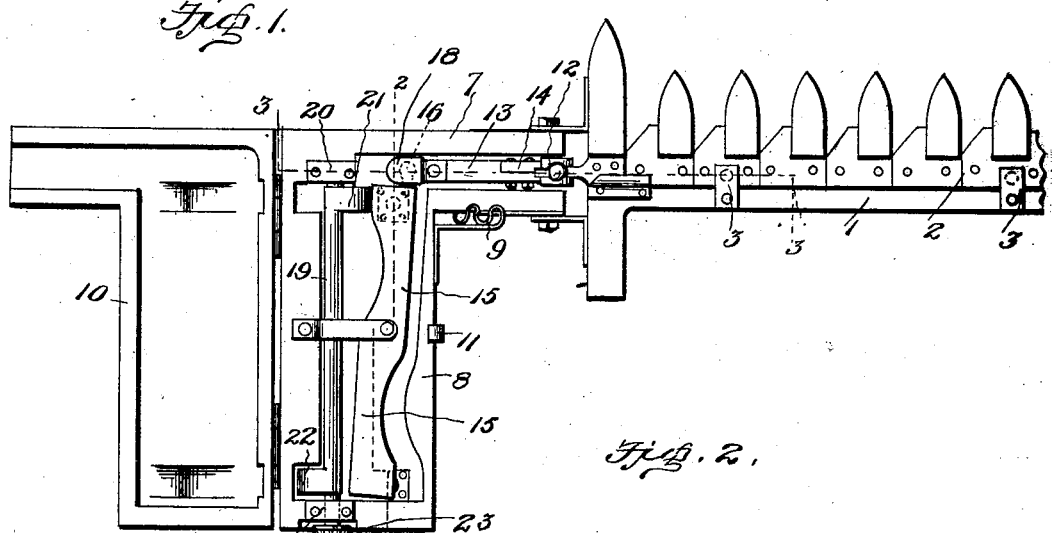
Fig. 1.
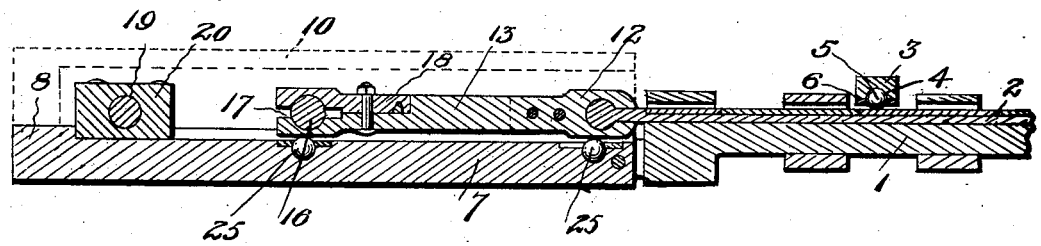
Fig. 2.
Fig. 3.
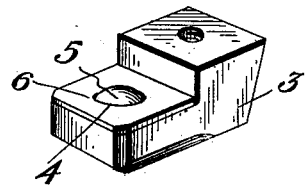
Fig. 4.
Witnesses
Inventor
C. C. Coffinberry,
by H. B. Willson & Co.
Attorneys
THE NORRIS PETERS CO., PHOTO-LITHO., WASHINGTON, D. C.

UNITED STATES PATENT OFFICE.

CORWIN C. COFFINBERRY, OF UNION, OREGON.

MOWING-MACHINE.

SPECIFICATION forming part of Letters Patent No. 673,016, dated April 30, 1901.

Application filed September 20, 1900. Serial No. 30,601. (No model.)

*To all whom it may concern:*

Be it known that I, CORWIN C. COFFIN-BERRY, a citizen of the United States, residing at Union, in the county of Union and State of Oregon, have invented certain new and useful Improvements in Mowing-Machines; and I do declare the following to be a full, clear, and exact description of the invention, such as will enable others skilled in the art to which it appertains to make and use the same.

My invention relates to improvements in mowing-machines, and particularly to mechanism for operating the sickles or cutter-bars of such machines; and the object of the invention is to provide mechanism for this purpose which will insure a constant, smooth, and steady motion of the sickle, which is simple, durable, and efficient in construction, and which is susceptible of application to existing machines without material change in the construction thereof.

With this and other minor objects in view the invention consists of certain novel features of construction, combination, and arrangement of parts, as will be hereinafter more fully described, and particularly pointed out in the appended claim.

In the accompanying drawings, Figure 1 is a top plan view of a finger-bar, sickle, and operating mechanism embodying my invention. Fig. 2 is a longitudinal section through the frame or bracket on line 2 2 of Fig. 1. Fig. 3 is a cross-section through the same on line 3 3 of Fig. 1. Fig. 4 is a detail view of one of the guards.

Referring now more particularly to the drawings, wherein like reference characters designate corresponding parts throughout the several views, 1 represents a finger-bar, and 2 a reciprocating sickle or cutter bar of the ordinary or any preferred construction. The guards 3, which hold the rear edge of the sickle against displacement, are formed with sockets 4, in which are arranged antifriction-balls 5, held within said sockets by keeper-plates 6 and bearing against the upper surface of the sickle to minimize friction. Each finger may be provided with a similar socket and ball, if desired, to prevent wear thereon and on the ledger-plates and adapt the cutter-bar to run easier. The inner end of the finger-bar is hinged or pivoted to the lateral extention 7 of a frame or bracket 8, to turn up to a vertical position in the usual manner, and a catch 9 on said extension is provided to hold the bar secured. The frame or bracket 8 may be applied to the frame of a mowing-machine in any preferred way and is provided with a hinged or pivoted cover 10, adapted to be held closed by a spring-catch 11 to inclose and protect the operating mechanism mounted thereon. The sickle or cutter bar carries at its inner end a ball or spherical head, which seats within a socket 12 upon the outer end of a pitman-rod 13, mounted to reciprocate on said extension 7, said socket being provided with a removable part 14, whereby the ball may be conveniently seated therein and removed therefrom. The pitman-rod and sickle are reciprocated by means of an oscillating lever 15, pivoted centrally to the bracket or frame at right angles to and in rear of said pitman. The forward arm of this lever is provided at its free end with a spherical head 16, fitted within a socket 17 at the inner end of the pitman-rod, by which a pivotal connection between said parts is afforded and easy movement thereof insured. This socket is provided with an upper removable section 18, which confines the head and by means of which said head may be applied and removed.

The oscillating lever is operated by means of a shaft 19, extending parallel therewith and mounted in bearings 20, located on the bracket or frame in rear of said lever. At its ends the shaft is formed or provided with cams 21 22, acting, respectively, upon the front and rear ends of said lever and projecting from diametrically opposite sides of the shaft to bear upon and operate the arms of the lever alternately and at each half-revolution of the shaft. Motion is communicated to the shaft through the medium of a gear 23, adapted to mesh with a gear upon the frame of the machine.

It will be seen that in operation the lever will be oscillated continuously by the rotation of the shaft through the medium of the cams and that its forward arm will thereby be caused to impart reciprocatory motion to the pitman-rod and sickle. A smooth and constant movement of the pitman-rod and sickle will be secured. The cover 10 is closed down in practice to exclude dust and dirt from the operating mechanism, and by simply throwing back said cover access may be had to said mechanism for cleaning or repairing the same.

Sockets 24 are provided in the bracket or frame beneath the pitman-rod and oscillating lever for the reception of balls 25, adapted to bear upon said parts to minimize friction and heating. These balls are confined by apertured keeper-plates 25'.

From the foregoing description, taken in connection with the accompanying drawings, the construction and operation of the improved mechanism will be readily understood, and it will be seen that a simple form of operating mechanism is provided by which a constant reciprocatory motion of the sickle is produced and jerking or irregular action thereof entirely obviated. While the preferred embodiment of the invention is as herein described, it will of course be understood that changes in the form, proportion, and minor details of construction may be made within the scope of the invention without departing from the spirit or sacrificing any of the advantages thereof.

Having thus fully described my invention, what I claim as new and useful, and desire to secure by Letters Patent of the United States, is—

An attachment for mowing-machines for operating the cutter-bars thereof, the same comprising an inclosing box or bracket frame having a hinged cover, the box and cover being provided with coöperating lateral end extensions, means for holding said cover closed, a finger-bar hinged to the outer extremity of the lateral extension of the box to turn up to a vertical position, means on the box for holding the finger-bar in such position, a reciprocating cutter-bar, an oscillating lever pivoted centrally to the body of the box or bracket frame, a pitman-rod mounted on said lateral end extension of the box or bracket frame, ball-and-socket connections between the connecting ends of the cutter-bar and pitman-rod and oscillating lever, a shaft mounted parallel with the oscillating lever and carrying cams to act alternately upon the opposite ends thereof, and an operating-gear on one end of said shaft, substantially as set forth.

In testimony whereof I have hereunto set my hand in presence of two subscribing witnesses.

CORWIN C. COFFINBERRY.

Witnesses:
FRED W. DAVIS,
C. E. COCHRAN.